US012764313B2

(12) United States Patent
Galpin et al.

(10) Patent No.: US 12,764,313 B2
(45) Date of Patent: Oct. 13, 2026

(54) METHOD OR AN APPARATUS IMPLEMENTING A NEURAL NETWORK-BASED PROCESSING AT LOW COMPLEXITY

(71) Applicant: InterDigital CE Patent Holdings, SAS, Paris (FR)

(72) Inventors: Franck Galpin, Thorigne-Fouillard (FR); Guillaume Boisson, Pleumeleuc (FR); Philippe Bordes, Laille (FR); Thierry Dumas, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/866,158

(22) PCT Filed: May 16, 2023

(86) PCT No.: PCT/EP2023/063095
§ 371 (c)(1),
(2) Date: Nov. 15, 2024

(87) PCT Pub. No.: WO2023/222675
PCT Pub. Date: Nov. 23, 2023

(65) Prior Publication Data

US 2025/0337933 A1 Oct. 30, 2025

(30) Foreign Application Priority Data

May 18, 2022 (EP) .................................... 22305731

(51) Int. Cl.
*H01L 29/94* (2006.01)
*H04N 19/124* (2014.01)
(Continued)

(52) U.S. Cl.
CPC ........... *H04N 19/42* (2014.11); *H04N 19/124* (2014.11); *H04N 19/136* (2014.11); *H04N 19/176* (2014.11); *H04N 19/30* (2014.11)

(58) Field of Classification Search
CPC .... H04N 19/42; H04N 19/124; H04N 19/136; H04N 19/176; H04N 19/30; G06N 3/048;
(Continued)

(56) References Cited

U.S. PATENT DOCUMENTS

| | | | | |
|---|---|---|---|---|
| 12,413,725 B2 * | 9/2025 | Pfaff | ...................... | H04N 19/11 |
| 2003/0108099 A1 * | 6/2003 | Nagumo | ................... | G06T 9/20 375/E7.199 |

(Continued)

FOREIGN PATENT DOCUMENTS

| | | | | |
|---|---|---|---|---|
| WO | WO 2021158378 A1 | 8/2021 | | |
| WO | WO-2023091040 A1 * | 5/2023 | ........... | H04N 19/587 |

OTHER PUBLICATIONS

Przewlocka-Rus et al, "Power-of-Two Quantization for Low Bitwidth and Hardware Compliant Neural Networks", arxiv.org, Cornell University Library, Mar. 9, 2022, 7 pages.

(Continued)

*Primary Examiner* — Joseph Suh
(74) *Attorney, Agent, or Firm* — Condo Roccia Koptiw LLP

(57) ABSTRACT

At least a method and an apparatus are presented for efficiently encoding or decoding video by applying a neural network-based processing to a tensor of input data to generate a tensor of output data. For example, the quantization of the tensors is limited to a scaling by a power of 2. For example, the tensor product layer, the bias addition layer and the activation are fused to reduce the number of operations and increase the available bits to represent the values.

22 Claims, 8 Drawing Sheets

(51) Int. Cl.

| | |
|---|---|
| ***H04N 19/136*** | (2014.01) |
| ***H04N 19/176*** | (2014.01) |
| ***H04N 19/30*** | (2014.01) |
| ***H04N 19/42*** | (2014.01) |

(58) Field of Classification Search
CPC ...... G06N 3/063; G06N 3/045; G06N 3/0495; G06N 3/0464
See application file for complete search history.

(56) References Cited

U.S. PATENT DOCUMENTS

| | | | | |
|---|---|---|---|---|
| 2005/0053294 | A1* | 3/2005 | Mukerjee | H04N 19/51 375/E7.125 |
| 2006/0126962 | A1* | 6/2006 | Sun | H04N 19/895 382/268 |
| 2018/0176578 | A1* | 6/2018 | Rippel | G06N 3/084 |
| 2019/0012559 | A1 | 1/2019 | Desappan et al. | |
| 2020/0302298 | A1* | 9/2020 | Van Baalen | G06N 3/04 |
| 2020/0410318 | A1* | 12/2020 | del Mundo | G06N 3/0495 |
| 2021/0036783 | A1* | 2/2021 | Bunandar | G06F 1/28 |
| 2021/0279591 | A1* | 9/2021 | Shamir | G06N 3/0499 |
| 2022/0067530 | A1* | 3/2022 | Khailany | G06N 3/063 |
| 2022/0215832 | A1* | 7/2022 | Ren | G06N 3/0455 |
| 2022/0292334 | A1* | 9/2022 | Pandey | G06N 3/045 |
| 2023/0004349 | A1* | 1/2023 | Kim | G06F 7/5443 |
| 2023/0004523 | A1* | 1/2023 | Meyer | G06F 7/49942 |
| 2023/0196072 | A1* | 6/2023 | Zou | G06N 3/0495 706/22 |
| 2023/0205489 | A1* | 6/2023 | Drane | G06F 7/02 708/501 |

OTHER PUBLICATIONS

"Infrastructure of audiovisual services—Coding of moving video—Reference software for ITU-T H.265 high efficiency video coding", International Telecommunication Union, ITU-T Telecommunication Standardization Sector of ITU, Series H: Audiovisual and Multimedia Systems, Recommendation ITU-T H.265.2, Oct. 2014, 12 pages.

"Infrastructure of audiovisual services—Coding of moving video, Versatile video coding", International Telecommunication Union (ITU), Series H: Audiovisual and Multimedia Systems, ITU-T Telecommunication Standardization Sector of ITU, Recommendation H.266, Aug. 2020, 513 pages.

Nayak et al., "Bit Efficient Quantization for Deep Neural Networks", arxiv.org, Cornell University Library, Oct. 7, 2019, 5 pages.

Hannuksela, et al., "AHG9: NNR post-filter SEI message," Joint Video Exploration Team of ISO/IEC JTC1/SC29/WG11 and ITU-T SG.16, Document: JVET-Z0052-v1; m59353, 26th JVET Meeting, by teleconference, Apr. 13, 2022, 14 pages.

Toderici, et al., "Full Resolution Image Compression with Recurrent Neural Networks", Institute of Electronics and Electrical Engineers (IEEE), 2017 IEEE Conference on Computer Vision and Pattern Recognition (CVPR), Honolulu, Hawaii, USA, Jul. 21, 2027, pp. 5435-5443.

* cited by examiner

METHOD OR AN APPARATUS IMPLEMENTING A NEURAL NETWORK-BASED PROCESSING AT LOW COMPLEXITY

CROSS REFERENCE TO RELATED APPLICATIONS

This application a U.S. National Stage Application under 35 U.S.C. 371 of International Patent Application No. PCT/EP2023/063095, filed May 16, 2023, which claims the benefit of and/or priority to European Application No. 22305731.6, filed on May 18, 2022, each of which is incorporated herein by reference in its entirety.

TECHNICAL FIELD

At least one of the present embodiments generally relates to a method or an apparatus for video encoding or decoding, and more particularly, to a method or an apparatus applying a neural network-based processing to a tensor of input data to generate a tensor of output data at low complexity.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to explored high compression technology includes neural network-based processing. A disadvantage of such neural network-based processing is the possible non-reproducibility of the processing, the complexity of the processing (due to the number of operations or the nature of operations themselves), the huge amount of data to be stored. It is thus desirable to provide an implementation of neural network allowing fully reproducible processing, optimizing the memory efficiency and the computation power. Therefore, there is a need to improve the state of the art.

SUMMARY

The drawbacks and disadvantages of the prior art are solved and addressed by the general aspects described herein.

According to a first aspect, there is provided a method. The method comprises obtaining a tensor of input data representative of data samples; and applying a neural network-based processing to the tensor of input data to generate a tensor of output data. According to a particular feature, the neural network-based processing comprises a plurality of processing layers, wherein each processing layer generates an intermediate tensor. At least one processing layer is represented as a tensor product between the tensor of input data and a weight tensor and at least one processing layers is represented as an addition of a bias tensor. Advantageously a scaling factor of any of the quantized representation of tensors such as the tensor of input data, the weight tensor, the bias tensor, an intermediate tensor, and the tensor of output data, use powers of two.

According to another aspect, there is provided a method. The method comprises video decoding by applying a neural network-based processing to a tensor of input data to generate a tensor of output data according to any of the disclosed embodiment, and wherein the data samples of the input data tensor comprise at least image block samples.

According to another aspect, there is provided a method. The method comprises video encoding by applying a neural network-based processing to a tensor of input data to generate a tensor of output data according to any of the disclosed embodiment, and wherein the data samples of the input data tensor comprise at least image block samples.

According to another aspect, there is provided an apparatus. The apparatus comprises one or more processors, wherein the one or more processors are configured to implement the method for video decoding according to any of its variants. According to another aspect, the apparatus for video decoding comprises means for applying a neural network-based processing to a tensor of input data to generate a tensor of output data according to any of the disclosed embodiment.

According to another aspect, there is provided another apparatus. The apparatus comprises one or more processors, wherein the one or more processors are configured to implement the method for video encoding according to any of its variants. According to another aspect, the apparatus for video encoding comprises means for applying a neural network-based processing to a tensor of input data to generate a tensor of output data according to any of the disclosed embodiment.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described encoding/decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated.

DETAILED DESCRIPTION

Various embodiments relate to a video coding system in which, in at least one embodiment, it is proposed to adapt video coding tools to low complexity neural-network processing. Different embodiments are proposed hereafter, introducing some tools modifications to reduce the codec complexity when neural-network processing is implemented in the tools such as non-limiting example of tools prediction or post-filtering. Amongst others, an encoding method, a decoding method, an encoding apparatus, a decoding apparatus based on this principle are proposed.

Moreover, the present aspects, although describing principles related to particular drafts of VVC (Versatile Video Coding) or to HEVC (High Efficiency Video Coding) specifications, or to ECM (Enhanced Compression Model) reference software are not limited to VVC or HEVC or ECM, and can be applied, for example, to other standards and recommendations, whether pre-existing or future-developed, and extensions of any such standards and recommendations (including VVC and HEVC and ECM). Unless indicated otherwise, or technically precluded, the aspects described in this application can be used individually or in combination.

The acronyms used herein are reflecting the current state of video coding developments and thus should be considered as examples of naming that may be renamed at later stages while still representing the same techniques.

Figure 1:
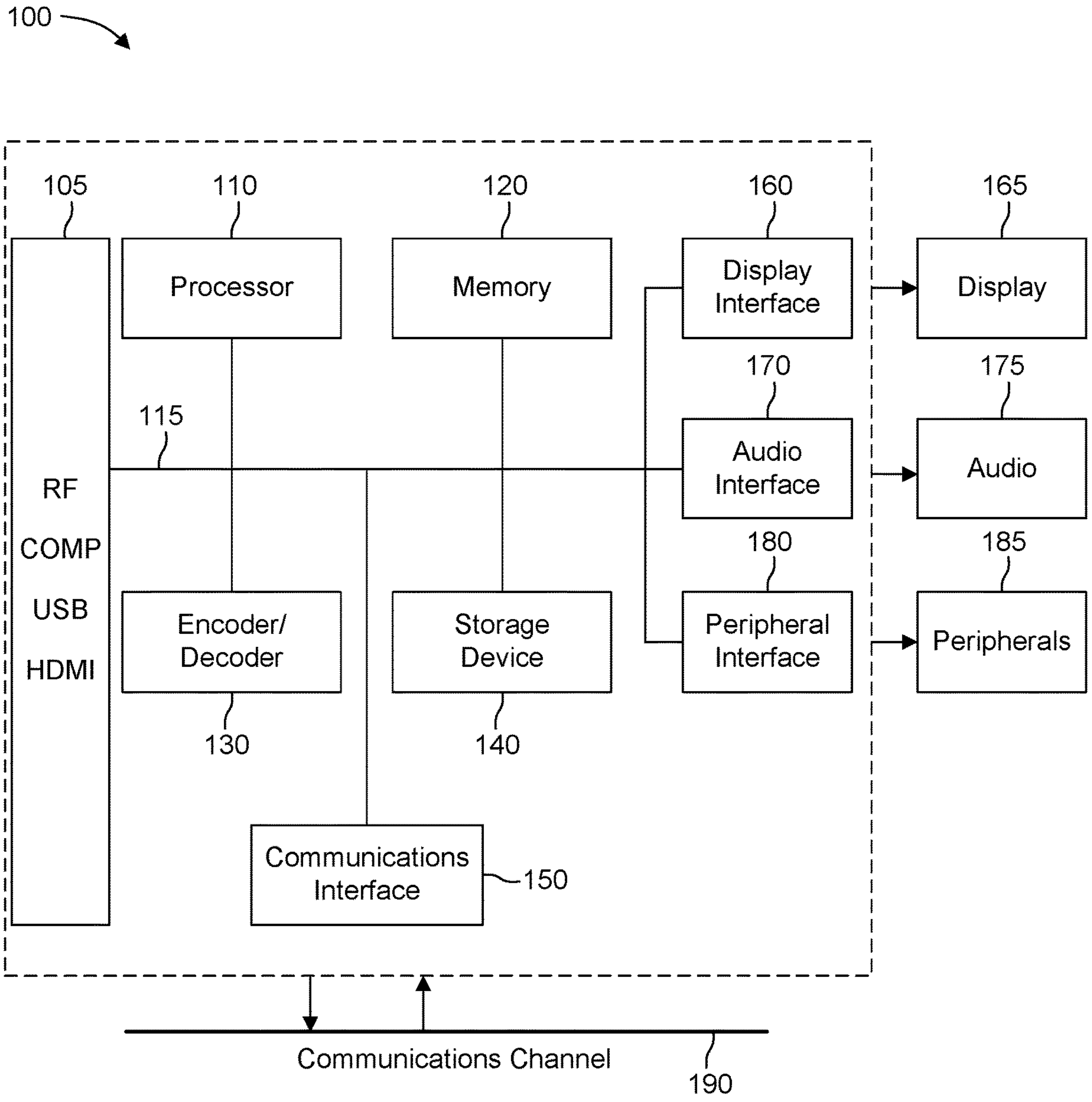
FIG. 1 illustrates a block diagram of an example apparatus in which various aspects of the embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple Ics and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g. a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface Ics or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
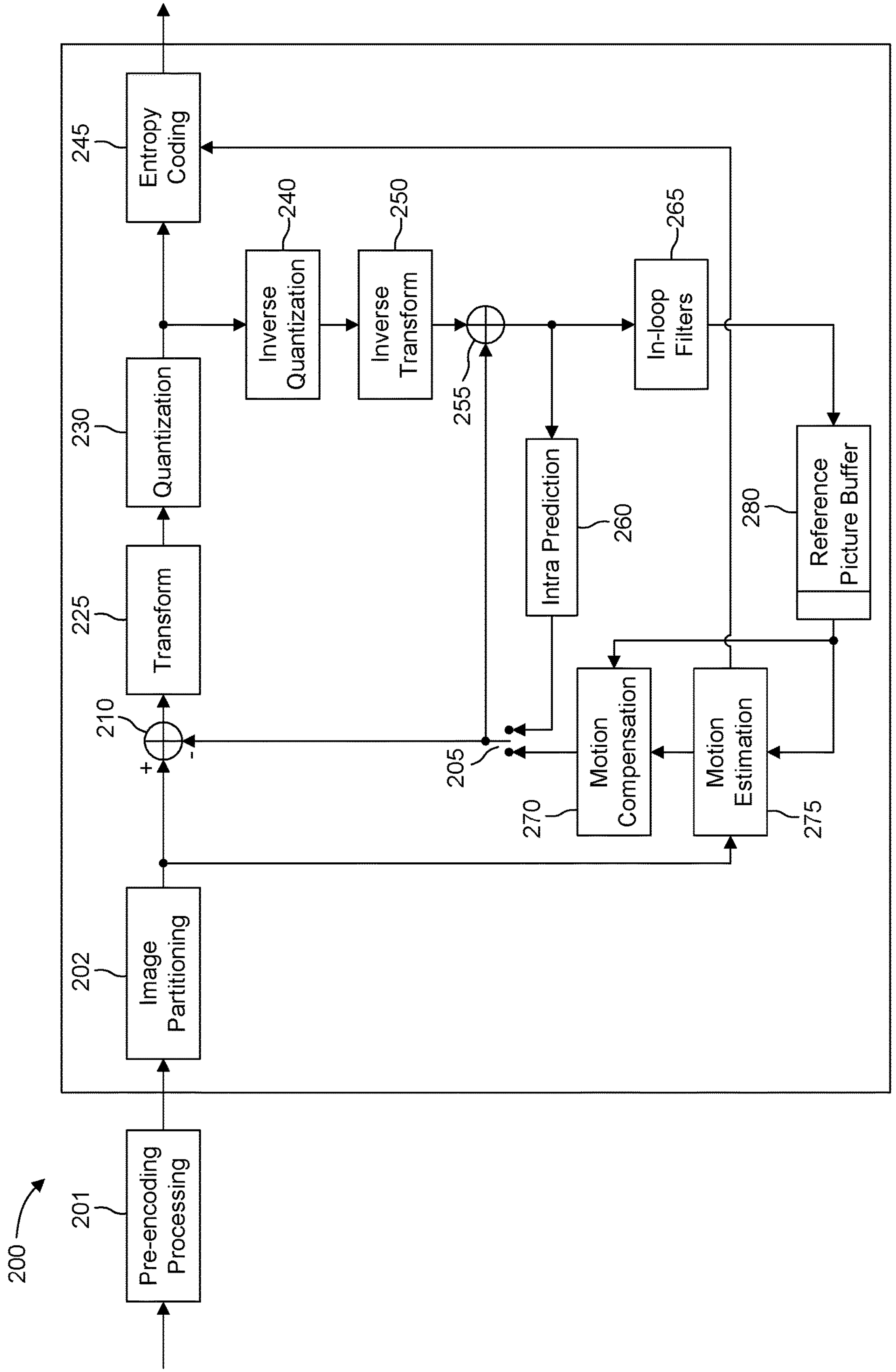
FIG. 2 illustrates a block diagram of an embodiment of video encoder in which various aspects of the embodiments may be implemented.

FIG. 2 illustrates an example video encoder 200, such as VVC (Versatile Video Coding) encoder. FIG. 2 may also illustrate an encoder in which improvements are made to the VVC standard or an encoder employing technologies similar to VVC.

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YcbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, Cus. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i. e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
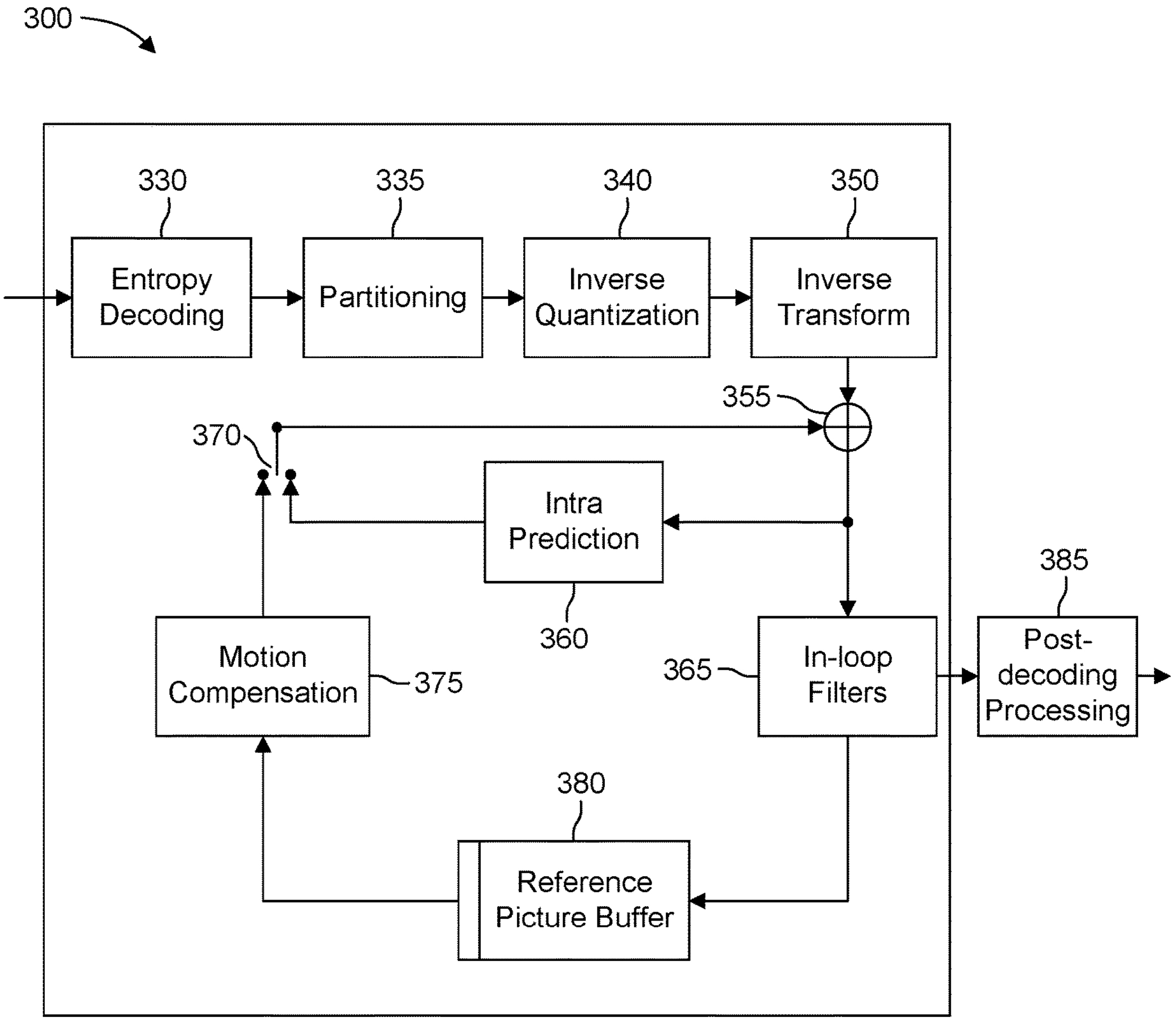
FIG. 3 illustrates a block diagram of an embodiment of video decoder in which various aspects of the embodiments may be implemented.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YcbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

In recently explored video coding solutions, neural network-based processing has been proposed, for example to provide a post-filtering stage or to provide block prediction.

Figure 4:
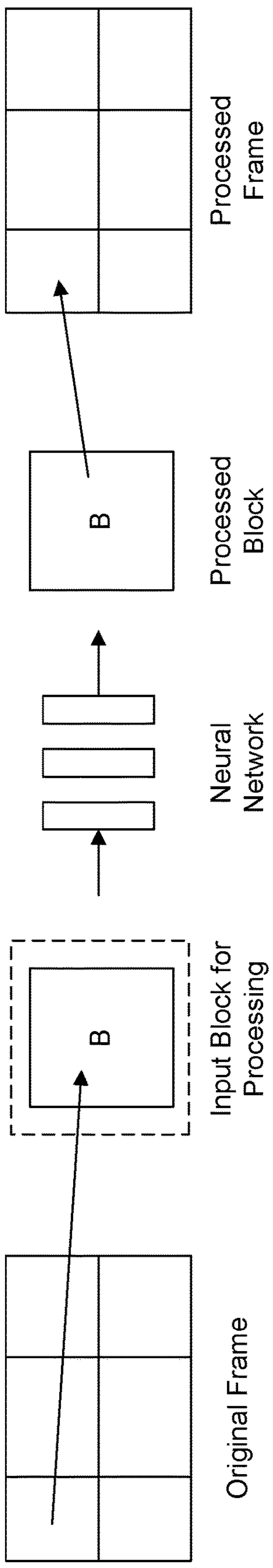
FIG. 4 illustrates a block-based pipeline for a neural-network processing in a video encoder/decoder in which various aspects of the embodiments may be implemented.

FIG. 4 illustrates a block-based pipeline for a neural-network processing in a video encoder/decoder in which various aspects of the embodiments may be implemented. A picture to be encoded, the original frame on FIG. 4, is partitioned and processed in units, input block on FIG. 4. The NN processing is applied to the block of the picture wherein the picture data is fed as an input vector to a NN, and the resulting processed block is output from the NN as an output vector, and for instance stored for additional encoding processing's. Advantageously the input data are not limited to picture samples, but may convey any information/statistics associated to one or more block of the picture such as non limiting example the coding mode, a quantization parameter, motion information. As a video decoding process generally performs a decoding pass reciprocal to the encoding pass, FIG. 4 also illustrates a NN processing applied to the block of the picture in a decoding process. In the context of video coding, strong constraints are required on the processing, including the NN processing:

Inference should be fully reproducible, hence all weights and operations should use integer arithmetic;

Complexity should be low: it is thus desirable to limit number of operations, to limit complex operations (division, multiplication), and avoid some operations (e.g. square root etc.);

Memory usage should be low: it is thus desirable to have quantized values on a limited number of bits.

As shown on FIG. 4, the NN processing comprises a plurality of levels. Each level learns to transform its input data into a slightly more abstract and composite representation. In a video coding application, the raw input may be the pixels/samples of the block; while the output is the processed block such as a predictor or a filtered block according to the above mentioned non-limiting examples. The output of a level uses a network representation. The inference denotes the process of feeding the network with input data and applying each layer in order to generate the output.

To meet the video coding constraints, three common ways used in general deep-learning frameworks are now described.

According to a first embodiment, a dynamic range quantization is used wherein weights w of the model are quantized on N bits (usually 8). The quantization is modelized with a scaling factor and a zero point (or offset) according to the following equation:

$$W = \text{clip}(\text{round}(a * w + f))$$

where W is the quantized integer value of the weight w in float, a is the scaling factor, f is the zero point or offset, round( ) is the function that chooses the nearest integer, and clip( ) is the function that sets the value to be in the range of representation of the integer, for example [−128,127]

for 8 bits. The range of representation of the integer value is also called bit depth or representation type in the following.

However, in this embodiment, the weights are converted back to float representation during inference and the computation is done in float.

According to a second embodiment, full integerization is used wherein both weights and intermediate results are quantized and represented as integers. All operations use integer arithmetic. In this case, additional parameters specifying the scale and offset (or zero point) of intermediate results (or tensors) are also defined.

According to a third embodiment, quantization aware training is implemented. Beyond the representation and computation type, the quantization constraints are taken into account during the training itself. It allows to consider the parameters or tensors accuracy reduction directly during the training.

Figure 5:
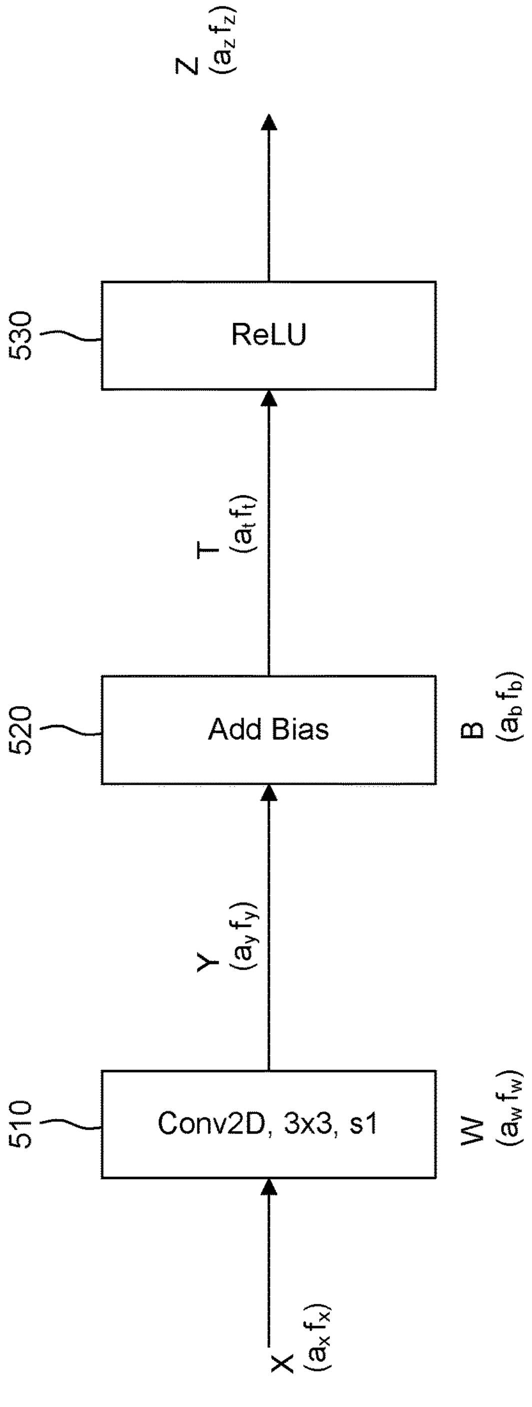
FIG. 5 illustrates a block diagram of an embodiment of a layered neural-network architecture in which various aspects of the embodiments may be implemented.

FIG. 5 illustrates a block diagram of an embodiment of a layered neural-network architecture in which various aspects of the embodiments may be implemented. The simple exemplary layered neural-network NN of FIG. 5 comprises 3 layers, namely a convolution layer 510, a bias layer 520 and an activation layer 530 (ReLU here). However, the present principles are not limited a to NN with 3 layers but can easily be generalized to a NN modelized as one or more linear layer(s) (matrices product and bias) along with one or more non-linear layer (activation function such Relu, Gelu, Sigmoid . . . ). FIG. 5 also shows the parameters a, f of a quantized NN model involved at each layer of the NN. The parameter a represents the scaling factor while the parameter b represents the zero point that applies to any tensor of the quantized NN model that is the weight tensor, the bias tensor and also to input/output tensor of each layer X, Y, T. All parameters a and f are known in advance. FIG. 5 also shows the intermediate results or tensors Y, T of a quantized NN model. However, the implementation of FIG. 5 still raises issues for instance regarding complexity as detailed hereafter.

Firstly, adding a zero point increases the number of operations to be performed during inference. For example, using a simple fully connected layer implying product of matrices:

$$t_j = \sum_i x_i w_{ij} + b_j$$

Where $x_i$ is the input tensor, $w_{ij}$ are the values of weight tensor and $b_j$ the biases. For the sake of clarity, only the indices i and j that are of interest for the model are explicitly detailed here and the tensors are represented as mono-dimensional $x_i$, $y_j$, $t_j$. However, the present principles are not limited to mono-dimensional tensor and the skilled in the art will non ambiguously generalize the disclosed principles to multi-dimensional tensor, such 3D tensor (2D spatial and depth). Thus, taking into account the above notation, when quantized, each term is noted as:

$$x_i = a_x(X_i - f_x)$$

$$w_{ij} = a_w(W_{ij} - f_w)$$

$$b_j = a_b(B_j - f_b)$$

where:

$a_x$, $a_w$ and $a_b$ are respectively the scaling factors for the input x, the weights w and the bias b;

$f_x$, $f_w$ and $f_b$ are respectively the offsets for the input x, the weights w and the bias b;

$X_i$, $W_{ij}$ and $B_j$ the quantized values of float values $x_i$, $W_{ij}$ and $b_j$.

Accordingly, the integerized version is obtained as:

$$t_j = \sum_j (a_x(X_i - f_x)a_w(W_{ij} - f_w)) + a_b(B_j - f_b)$$

which can be simplified as:

$$t_j = a_x a_w \sum_i (X_i W_{ij}) - a_x a_w f_w \sum_i X_i + B'_j$$

Where B'j is a term that can be computed offline as it only depends on the model parameters ($a_x$, $f_x$, $W_{ij}$, $f_w$, $a_b$, $B_j$ and $f_b$).

In order to perform all operations using only integer arithmetic, an additional information on the results rescaling is necessary. The scaling factor is denoted as $s_t$. Advantageously, this scaling factor can be a power of 2 in order to be performed using bit shift operation.

$$T_j = \text{clip}\left(s_t \sum_i (X_i W_{ij}) - s_t f_w \sum_i X_i\right) + B''_j$$

With the relationship:

$$t_j = a_t(T_j - f_t)$$

The clipping operation ensures that the result is included inside the representation used for intermediate results. One can noticed that the zero point introduces the additional computation of a term $\Sigma X_i$. The bias term is also adapted to take into account the internal scaling $s_t$ and also some potential offset of the results.

In practice, the above equation requires the following steps for computation:

The accumulated product $X_i W_{ij}$ is computed,

It is then rescaled by the factor $s_t$,

The scaling factor $\alpha_t$ is computed as $$a_t = \frac{a_x a_w}{s_t},$$

The accumulated product $X_i$ is computed,

It is then rescaled by the factor $s_t f_w$,

The 2 above accumulated product and the term $B''_j$ are accumulated and clipped to be in the range of the underlying type, and $f_t$ depends on $B''_j$ which only depends on known parameters.

Secondly, in most methods, the bit depth for weights and tensors representation is 8 bits as it targets general architecture such as CPU, GPU or TPU. However, with specialized hardware, the bit depth for both weights and intermediate computation results can have arbitrary bit depth.

Thirdly, in most methods, the scaling factor is arbitrary, and an integer multiplication is needed in order to compute the scaling factor of the output. In the general case, a division might also be needed to adapt the scale of the output of a layer.

Fourthly, the representation does not take into account the nature of the operation in the model. For example, the output of an activation layer uses the same representation (scale, offset) whatever the activation.

These issues are solved and addressed by the general aspects described herein, which are directed to a representation that takes into account the following constraints:

Minimize the number of operations;

Simplify some operations, typically replacing multiplication and division by bit shift operations;

Take into account the nature of the operations;

Reduce the number of parameters to represent the model.

In the following, the present principles apply in a same way to matrices product (dense layer, fully connected layer) or to convolution-based layers. However, it is described for a matrices' product layer.

According a first embodiment, a quantization with low complexity is disclosed wherein the scaling factor is a power of two. Indeed, in order to minimize the complexity, the quantization is limited to a scaling by a power of 2. It allows to perform the multiplication and division of the quantization using a bit shift. Besides, the quantization also involves a null zero point, thus no additional operation is performed for a quantization offset.

Figure 6:
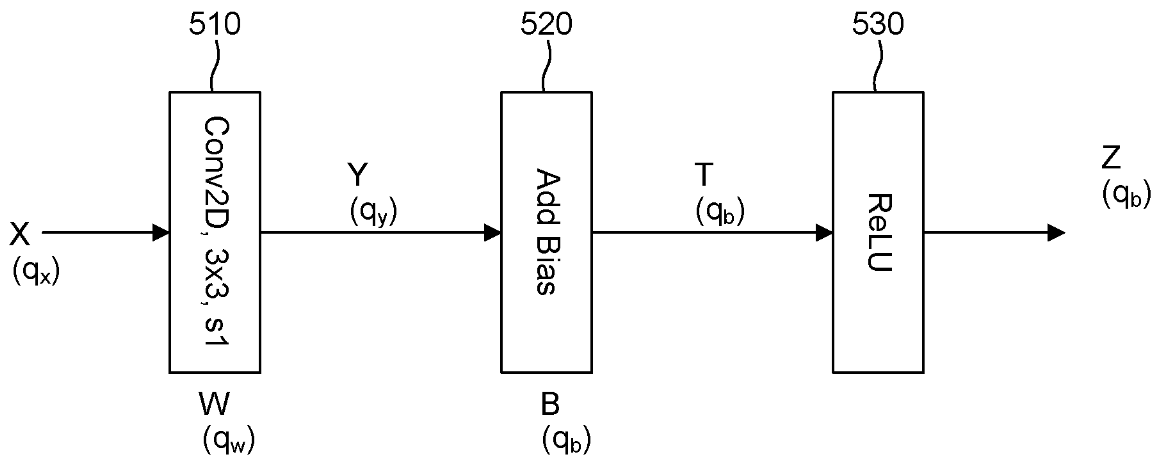
FIG. 6 illustrates a block diagram of a layered neural-network architecture with low complexity quantization according to a general aspect of at least one embodiment.

FIG. 6 illustrates a block diagram of an embodiment of a layered neural-network architecture with low complexity quantization. According to a particular variant of the first embodiment implemented to the above exemplary NN of FIG. 5 with the same notation, we obtain:

$$t_j = \sum x_i w_{ij} + b_j$$

Where:

$$x_i = 2^{q_x} X_i$$

$$w_{ij} = 2^{q_w} W_{ij}$$

$$b_j = 2^{q_b} B_j$$

With $q_x$, $q_w$, $q_b$ are integers known in advanced.

$$T_j = \text{clip}\left(2^{q_b-(q_y-(q_x+q_w))}\left(\text{clip}\left(2^{q_y-(q_x+q_w)}\sum_i X_i W_{ij}\right)\right) + 2^{q_b} B_j\right)$$

In practice, the above equation requires the following steps for computation:

The accumulated product $X_i W_{ij}$ is computed

A bit shift by $q_b-(q_x+q_w)$ and clipping of the result. The quantizer of this intermediate result is $q_y-(q_x+q_w)$ A bit shift by $q_b-(q_y-(q_x+q_w))$ of the result Adding the bias $2^{q_b}B_j$ and clipping the final result The quantizer of the output tensor is then $q_t=q_b$ Advantageously, the number of parameters to control the accuracy and bit depth are reduced. We assume that the bias layer drives the quantization of the input and output of the activation layer. All multiplication/division operations for quantization are advantageously replaced by a shift (power of 2 multiplication/division). No additional operation is needed for implementing a zero point.

According to a particular variant, wherein the convolution/matrix multiplication layer and bias layer are fused, the number of operations can be further reduced.

Figure 7:
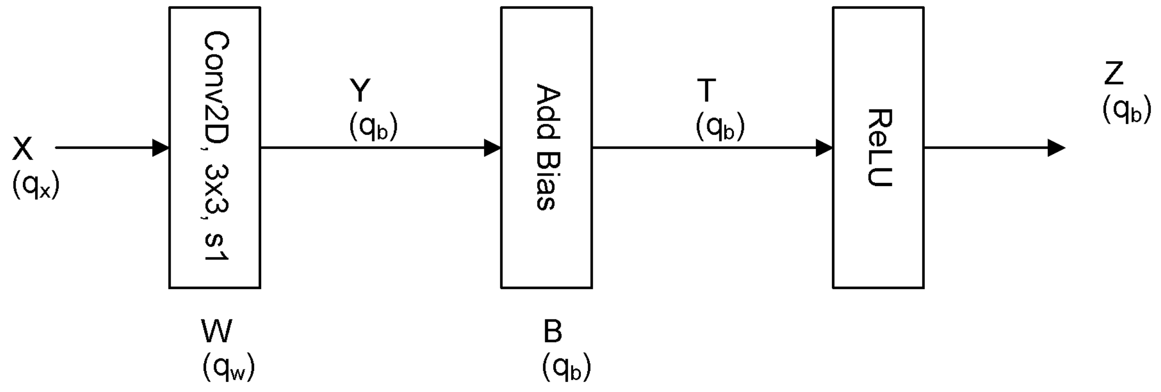
FIG. 7 illustrates a block diagram of an embodiment of a layered neural-network architecture with low complexity quantization in fused convolution and bias layers.

FIG. 7 illustrates a block diagram of an embodiment of a layered neural-network architecture with low complexity quantization in fused convolution and bias layers. Accordingly, the scaling factors of the intermediate tensor Y and T are equal $q_y=q_b$.

Assuming a fused convolution/matrix multiplication and bias layer, the above equation can be further simplified:

$$T_j = \text{clip}\left(2^{q_b-(q_x+q_w)}\sum_i (X_i W_{ij}) + 2^{q_b} B_j\right)$$

In practice, the steps to compute a value of the tensor T are:

Accumulate the sum $\Sigma X_i W_{ij}$ in an intermediate variable H;

Shift the variable H using: $H'=H>>((q_x+q_w)-q_b)$ so that H is quantized with $q_b$;

Add the bias $Z_j=2^{q_b}B_j+H'$ where the scale of Z is given by two at the power $q_b$ ($2\wedge q_b$);

Clip to have the value saturating on the bit depth of the underlying representation.

The skilled in the art will appreciate that a right shift with a negative value is considered equivalent to a left shift.

According to a particular variant, the processing of sum of partial products is split. This variant is particularly adapted to input tensors having a very large bit depth. Indeed, when the input tensors have a very large bit depth, the intermediate computation might overflow the underlying type.

According to a non-limiting example of this variant, the processing:

$$Y_j = \text{clip}\left(2^{q_y-(q_x+q_w)}\sum_{\Omega} X_i W_{ij}\right)$$

is split into 2 complementary, non-overlapping parts Ω1 and Ω2 as described below:

$$Y_j = \text{clip}\left(\text{clip}\left(2^{q_y-(q_x+q_w)}\sum_{\Omega 1} X_i W_{ij}\right) + \text{clip}\left(2^{q_y-(q_x+q_w)}\sum_{\Omega 2} X_i W_{ij}\right)\right)$$

The steps of the processing can be described as:

Accumulate the sum $\Sigma X_i W_{ij}$ in an intermediate variable H1 only using only the indices i in Ω1, and accumulate the sum $\Sigma X_i W_{ij}$ in an intermediate variable H2 for the indices i in Ω2. It is assumed that $\Omega=\Omega 1\cup\Omega 2$.

Each intermediate variable H1 and H2 is bit shifted and clipped:

$$Eg\ H1' = \text{clip}(H1 >> ((q_y - (q_x + q_w)))$$

so that H1 is quantized with $q_y$ $$Eg\ H2' = \text{clip}(H2 >> ((q_y - (q_x + q_w)))$$

so that H2 is also quantized with $q_y$

Add the intermediate variables and clip the result: H=clip (H1+H2). Advantageously, the same principle is used to split the accumulation in N stages to avoid overflow.

Figure 8:
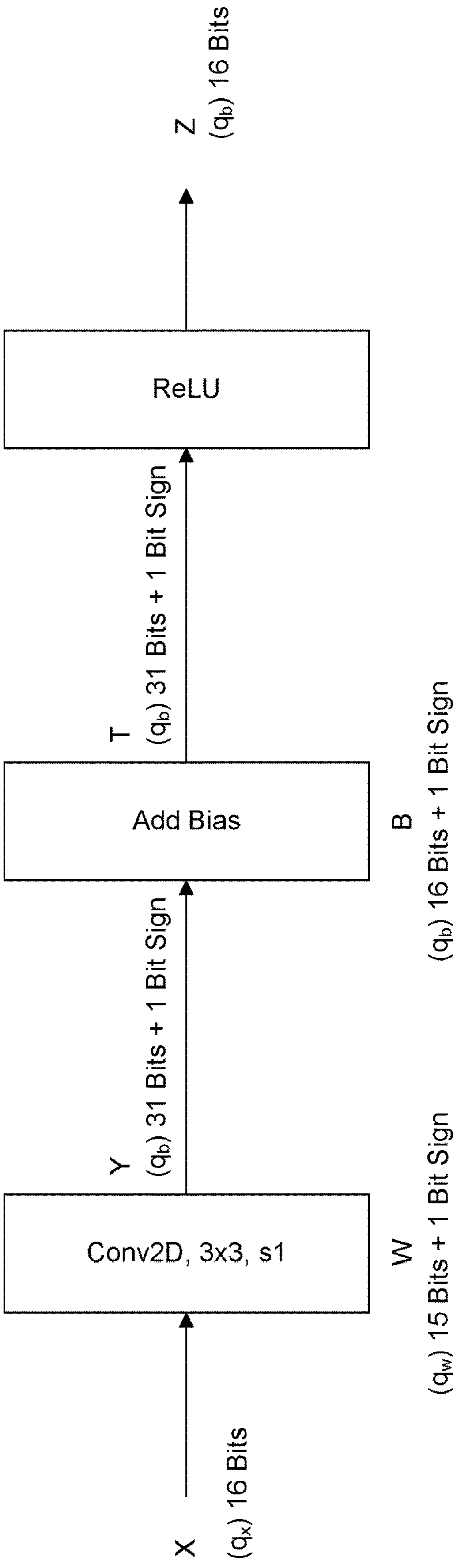
FIG. 8 shows a block diagram of a layered neural-network training and of a layered neural-network training with low complexity quantization according to a general aspect of at least one embodiment an example of transformation to perform quantization aware training/fine-tuning

According to a second embodiment, the activation operation is also fused inside the convolution/matrix multiplication. FIG. 8 illustrates a block diagram of an embodiment of a layered neural-network architecture with fused activation operation. Indeed, to further optimize the quantization, the activation operation is fused inside the convolution/matrix multiplication. According to a non-limiting variant, the activation layer is for instance a ReLU. In the context of neural networks, the rectifier or ReLU (Rectified Linear Unit) activation function is an activation function defined as the positive part of its argument x:

$$f(x)=\max(0,x).$$

Thus, in such case, the output is known to be positive. Advantageously, the underlying representation of the output is transformed to avoid the bit of the sign. FIG. 8 shows an example of such processing with the associated bit depth:

The input tensor X is assumed to be positive (and thus does not require any bit for the sign). It is the case for the model inputs and also for intermediate tensors after the activation when ReLU is used;

The weights used a 16 bits (15 bits+1 bit for sign) underlying type;

Intermediate results Y use an underlying type of 32 bits (31 bits+1 bit of sign);

They are added to the bias of 17 bits (16 bits+1 bit for sign);

The activation clips and shifts the results to get an intermediate tensor using 16 bits (without the bit of sign).

In this example, it shows that 1 bit of sign is avoided for intermediate results (between each set of convolution+bias+activation layers) as the output of the activation layer is positive. The same principle applies for other type of layers (dense etc.) with activation outputting only positive values.

According to a third embodiment, a quantization aware training is disclosed wherein the training stage also generates quantization parameters q for each layer. In order to obtain the quantization parameters q of each layer, several approaches are possible:

an offline quantization: each parameter q for the weights is found offline by checking the results on a small representative dataset.

a quantization aware training is performed: each layer is replaced by a quantized version of the weights.

Figure 9:
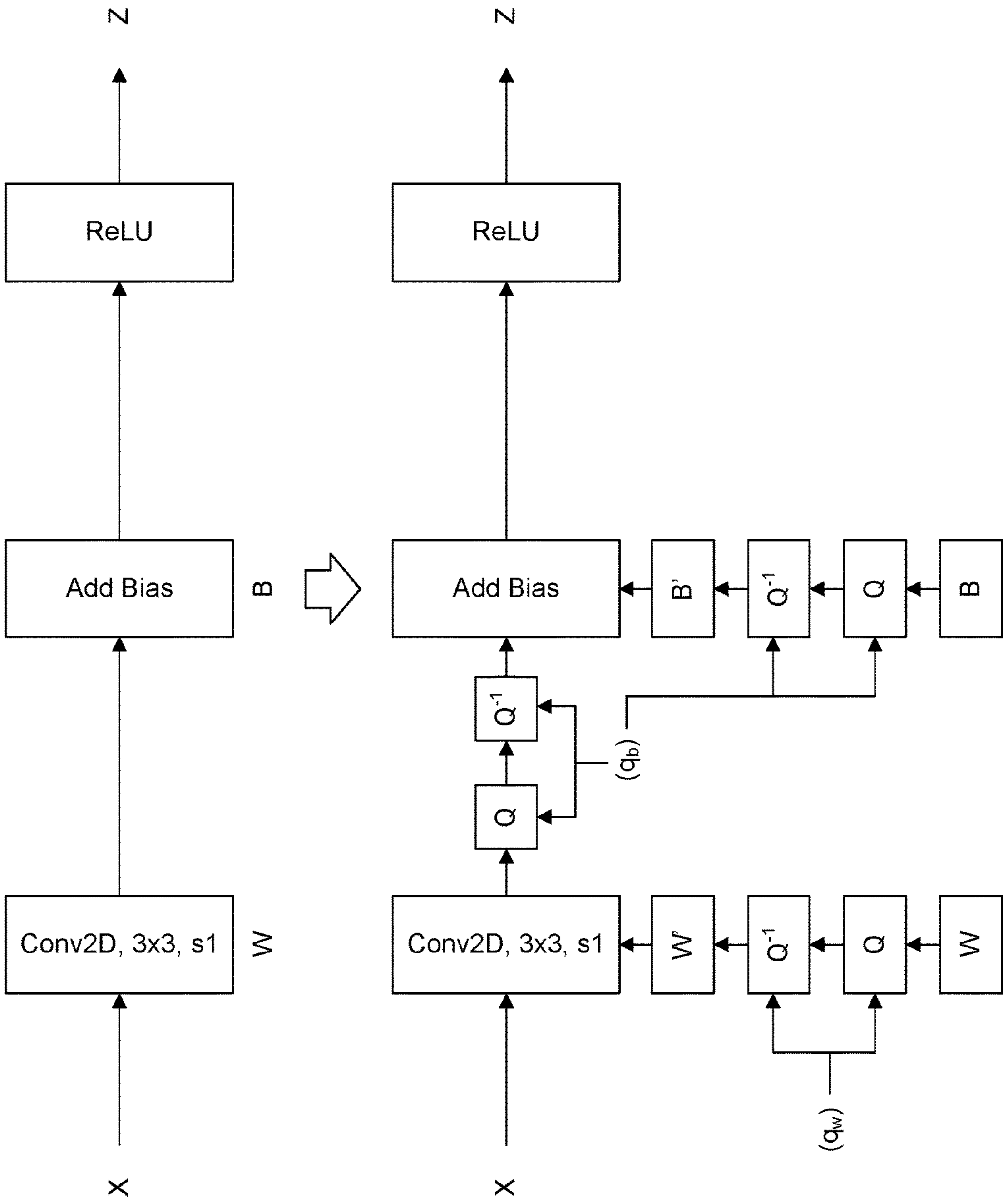
FIG. 9 illustrates a block diagram of an embodiment of transformation of a layered neural-network architecture to perform quantization aware training.

FIG. 9 illustrates a block diagram of an embodiment of transformation of layered neural-network architecture to perform quantization aware training. The model on the top of FIG. 9 is replaced by the model in the bottom. Accordingly, for each weight, quantization layer Q and dequantization layer $Q^{-1}$ are inserted, both layers use the q parameters. All computations are still done in floating point. As the quantization operation is not differentiable, a proxy for the quantization is used, typically using for example STE (Straight-through estimator), uniform noise, quantization function approximation etc. Then, the output of the multiplication or convolution is also quantized/dequantized using the same method.

Additional Embodiments and Information

Figure 10:
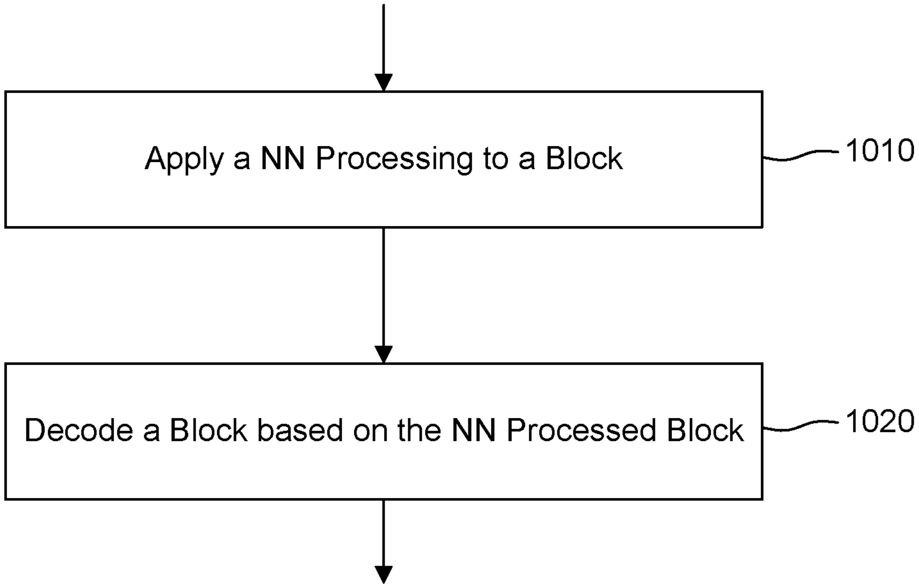
FIG. 10 illustrates a generic decoding method according to a general aspect of at least one embodiment.

FIG. 10 illustrates a generic decoding method (300) according to a general aspect of at least one embodiment. The block diagram of FIG. 10 partially represents modules of a decoder or decoding method, for instance implemented in the exemplary decoder of FIG. 3. The method comprises applying a neural network-based processing (1020) to a tensor of input data to generate a tensor of output data wherein the input data comprise at least the samples of image block. Advantageously, the inference of the neural network-based processing uses any of the disclosed features to reduce complexity of the neural network-based processing. The NN processed block (output data) is then encoded (1020) according to any of the variants described herein.

Figure 11:
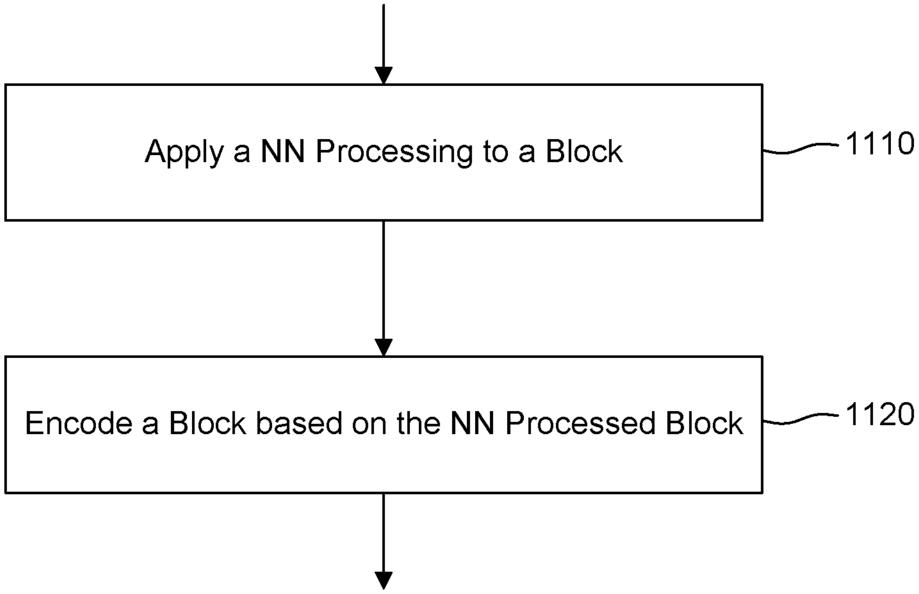
FIG. 11 illustrates a generic encoding method according to a general aspect of at least one embodiment.

FIG. 11 illustrates a generic encoding method (200) according to a general aspect of at least one embodiment. The block diagram of FIG. 11 partially represents modules of an encoder or encoding method, for instance implemented in the exemplary encoder of FIG. 2. The method comprises applying a neural network-based processing (1120) to a tensor of input data to generate a tensor of output data wherein the input data comprise at least the samples of image block. Advantageously, the inference of the neural network-based processing uses any of the disclosed features to reduce complexity of the neural network-based processing. The NN processed block (output data) is then encoded (1120) according to any of the variants described herein.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as “first”, “second”, etc. may be used in various embodiments to modify an element, component, step, operation, etc., for example, a “first decoding” and a “second decoding”. Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, as non-limiting example, the partitioning module, the intra prediction modules (202, 260, 335, 360), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. “Decoding,” as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase “decoding process” is intended to refer specifically to a subset of operations or generally to the broader decoding process will be clear based on the context of the specific descriptions and is believed to be well understood by those skilled in the art. Various implementations involve encoding. In an analogous way to the above discussion about “decoding”, “encoding” as used in this application may encompass all or part of the processes performed, for example, on an input video sequence in order to produce an encoded bitstream.

Note that the syntax elements as used herein are descriptive terms. As such, they do not preclude the use of other syntax element names.

The implementations and aspects described herein may be implemented as various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

SDP (session description protocol), a format for describing multimedia communication sessions for the purposes of session announcement and session invitation, for example as described in RFCs and used in conjunction with RTP (Real-time Transport Protocol) transmission;

DASH MPD (Media Presentation Description) Descriptors, for example as used in DASH and transmitted over HTTP, a Descriptor is associated to a Representation or collection of Representations to provide additional characteristic to the content Representation;

RTP header extensions, for example as used during RTP streaming;

ISO Base Media File Format, for example as used in OMAF and using boxes which are object-oriented building blocks defined by a unique type identifier and length also known as 'atoms' in some specifications;

HLS (HTTP live Streaming) manifest transmitted over HTTP. A manifest can be associated, for example, to a version or collection of versions of a content to provide characteristics of the version or collection of versions.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Adapting neural-network inference in the decoder and/or encoder.

A method, process, apparatus, medium storing instructions, medium storing data, or signal according to any of the embodiments described.

A TV, set-top box, cell phone, tablet, or other electronic device that performs a neural-network process adapted to low complexity according to any of the embodiments described.

A TV, set-top box, cell phone, tablet, or other electronic device that performs a neural-network process adapted to low complexity according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and a neural-network process adapted to low complexity according to any of the embodiments described.

A TV, set-top box, cell phone, tablet, or other electronic device that receives (e.g. using an antenna) a signal over the air that includes an encoded image, and performs a neural-network process adapted to low complexity according to any of the embodiments described.

The invention claimed is:

1. A computer-implemented method, comprising:

obtaining a tensor of input data representative of coded data samples of an image block;

applying a neural network-based processing to the tensor of input data to generate a tensor of output data; and decoding the image block based on the tensor of output data;

wherein the neural network-based processing comprises a plurality of processing layers, wherein each of the plurality of processing layers generates an intermediate tensor, wherein at least one of the plurality of processing layers is represented as a tensor product between the tensor of input data and a weight tensor, and wherein at least one of the plurality of processing layers is represented as an addition of a bias tensor and is fused with the at least one of the plurality of processing layer representing the tensor product;

wherein a scaling factor of a quantized representation of tensor of input data, a scaling factor of a quantized representation of the weight tensor, a scaling factor of a quantized representation of the bias tensor, a scaling factor of a quantized representation of an intermediate tensor, and a scaling factor of a quantized representation of the tensor of output data are powers of two, a quantized representation of a tensor being obtained by a shift according to an exponent of a respective power of two scaling factor; and wherein the fusion of the at least one processing layer representing the addition of the bias tensor with the at least one processing layer representing the tensor product involves a single combined bit-shifting operation for scaling a result of the tensor product with the scaling factor of the quantized representation of the bias tensor.

2. The method of claim 1, wherein an offset parameter of a quantized representation of tensor of input data, an offset parameter of a quantized representation of the weight tensor, an offset parameter of a quantized representation of the bias tensor, an offset parameter of a quantized representation of an intermediate tensor, and an offset parameter of a quantized representation of the tensor of output data are equal to zero.

3. The method of claim 1, wherein an intermediate tensor resulting from a fusion of the tensor product and bias tensor addition is obtained by:

accumulating a sum of partial products of quantized representation of the tensor of input data and quantized representation of the weight tensor in an intermediate variable;

shifting the intermediate variable using the scaling factor of the quantized representation of tensor of input data, the scaling factor of the quantized representation of the weight tensor, and the scaling factor of the quantized representation of the bias tensor; and clipping the result of a sum of the bias tensor to the shifted intermediate variable to obtain the intermediate tensor on a bit depth of the quantized representation of the bias tensor.

4. The method of claim 3, wherein accumulating the sum of partial products of quantized representation of the tensor of input data and quantized representation of the weight tensor uses at least 2 intermediate variables to avoid overflow.

5. The method of claim 1, wherein at least one of the plurality of processing layers comprises an activation layer that is fused with the at least one of the plurality of processing layers representing a fusion of the tensor product and bias tensor addition.

6. The method of claim 5, wherein the tensor of input data is positive, and represented without any bit sign;

wherein the tensor of output data is positive and represented without any bit sign; and wherein the activation layer clips and shifts the at least one of the plurality of processing layers representing the tensor product with the addition of a bias to generate an intermediate tensor on a bit depth of the tensor of input data.

7. A computer-implemented method, comprising:

obtaining a tensor of input data representative of data samples of an image block;

applying a neural network-based processing to the tensor of input data to generate a tensor of output data; and encoding the image block based on the tensor of output data;

wherein the neural network-based processing comprises a plurality of processing layers, wherein each of the plurality of processing layers generates an intermediate tensor, wherein at least one of the plurality of processing layers is represented as a tensor product between the tensor of input data and a weight tensor, and wherein at least one of the plurality of processing layers is represented as an addition of a bias tensor and is fused with the at least one of the plurality of processing layer representing the tensor product;

wherein a scaling factor of a quantized representation of tensor of input data, a scaling factor of a quantized representation of the weight tensor, a scaling factor of a quantized representation of the bias tensor, a scaling factor of a quantized representation of an intermediate tensor, and a scaling factor of a quantized representation of the tensor of output data are powers of two, and a quantized representation of a tensor being obtained by a shift according to an exponent of a respective power of two scaling factor; and wherein the fusion of the at least one processing layer representing the addition of the bias tensor with the at least one processing layer representing the tensor product involves a single combined bit-shifting operation for scaling a result of the tensor product with the scaling factor of the quantized representation of the bias tensor.

8. The method of claim 7, wherein an offset parameter of a quantized representation of tensor of input data, an offset parameter of a quantized representation of the weight tensor, an offset parameter of a quantized representation of the bias tensor, an offset parameter of a quantized representation of an intermediate tensor, and an offset parameter of a quantized representation of the tensor of output data are equal to zero.

9. The method of claim 7, wherein an intermediate tensor resulting from a fusion of the tensor product and bias tensor addition is obtained by:

accumulating a sum of partial products of quantized representation of the tensor of input data and quantized representation of the weight tensor in an intermediate variable;

shifting the intermediate variable using the scaling factor of the quantized representation of tensor of input data, the scaling factor of the quantized representation of the weight tensor, and the scaling factor of the quantized representation of the bias tensor; and clipping the result of a sum of the bias tensor to the shifted intermediate variable to obtain the intermediate tensor on a bit depth of the quantized representation of the bias tensor.

10. The method of claim 9, wherein accumulating the sum of partial products of quantized representation of the tensor of input data and quantized representation of the weight tensor uses at least 2 intermediate variables to avoid overflow.

11. The method of claim 7, wherein at least one of the plurality of processing layers comprises an activation layer that is fused with the at least one of the plurality of processing layers representing a fusion of the tensor product and bias tensor addition.

12. The method of claim 11, wherein the tensor of input data is positive, and represented without any bit sign;

wherein the tensor of output data is positive and represented without any bit sign; and wherein the activation layer clips and shifts the at least one of the plurality of processing layers representing the tensor product with the addition of a bias to generate an intermediate tensor on a bit depth of the tensor of input data.

13. An apparatus comprising a memory and one or more processors, wherein the one or more processors are configured to:

obtain a tensor of input data representative of coded data samples of an image block;

apply a neural network-based processing to the tensor of input data to generate a tensor of output data; and decode the image block based on the tensor of output data;

wherein the neural network-based processing comprises a plurality of processing layers, wherein each of the plurality of processing layers generates an intermediate tensor, wherein at least one of the plurality of processing layers is represented as a tensor product between the tensor of input data and a weight tensor, and wherein at least one of the plurality of processing layers is represented as an addition of a bias tensor and is fused with the at least one of the plurality of processing layer representing the tensor product;

wherein a scaling factor of a quantized representation of tensor of input data, a scaling factor of a quantized representation of the weight tensor, a scaling factor of a quantized representation of the bias tensor, a scaling factor of a quantized representation of an intermediate tensor, and a scaling factor of a quantized representation of the tensor of output data are powers of two, a quantized representation of a tensor being obtained by a shift according to an exponent of a respective power of two scaling factor; and wherein the fusion of the at least one processing layer representing the addition of the bias tensor with the at least one processing layer representing the tensor product involves a single combined bit-shifting operation for scaling a result of the tensor product with the scaling factor of the quantized representation of the bias tensor.

14. The apparatus of claim 13, wherein an intermediate tensor result from a fusion of the tensor product and bias tensor addition is obtained by:

accumulating a sum of partial products of quantized representation of the tensor of input data and quantized representation of the weight tensor in an intermediate variable;

shifting the intermediate variable using the scaling factor of the quantized representation of tensor of input data, the scaling factor of the quantized representation of the weight tensor, and the scaling factor of the quantized representation of the bias tensor; and clipping the result of a sum of the bias tensor to the shifted intermediate variable to obtain the intermediate tensor on a bit depth of the quantized representation of the bias tensor.

15. The apparatus of claim 13, wherein at least one of the plurality of processing layers comprises an activation layer that is fused with the at least one of the plurality of processing layers representing a fusion of the tensor product and bias tensor addition.

16. An apparatus comprising a memory and one or more processors, wherein the one or more processors are configured to:

obtain a tensor of input data representative of data samples of an image block;

apply a neural network-based processing to the tensor of input data to generate a tensor of output data; and encode the image block based on the tensor of output data;

wherein the neural network-based processing comprises a plurality of processing layers, wherein each of the plurality of processing layers generates an intermediate tensor, wherein at least one of the plurality of processing layers is represented as a tensor product between the tensor of input data and a weight tensor, and wherein at least one of the plurality of processing layers is represented as an addition of a bias tensor and is fused with the at least one of the plurality of processing layer representing the tensor product;

wherein a scaling factor of a quantized representation of tensor of input data, a scaling factor of a quantized representation of the weight tensor, a scaling factor of a quantized representation of the bias tensor, a scaling factor of a quantized representation of an intermediate tensor, and a scaling factor of a quantized representation of the tensor of output data are powers of two, a quantized representation of a tensor being obtained by a shift according to an exponent of a respective power of two scaling factor; and wherein the fusion of the at least one processing layer representing the addition of the bias tensor with the at least one processing layer representing the tensor product involves a single combined bit-shifting operation for scaling a result of the tensor product with the scaling factor of the quantized representation of the bias tensor.

17. The apparatus of claim 16, wherein an intermediate tensor resulting from a fusion of the tensor product and bias tensor addition is obtained by:

accumulating a sum of partial products of quantized representation of the tensor of input data and quantized representation of the weight tensor in an intermediate variable;

shifting the intermediate variable using the scaling factor of the quantized representation of tensor of input data, the scaling factor of the quantized representation of the weight tensor, and the scaling factor of the quantized representation of the bias tensor; and clipping the result of a sum of the bias tensor to the shifted intermediate variable to obtain the intermediate tensor on a bit depth of the quantized representation of the bias tensor.

18. The apparatus of claim 16, wherein at least one of the plurality of processing layers comprises an activation layer that is fused with the at least one of the plurality of processing layers representing a fusion of the tensor product and bias tensor addition.

19. The method of claim 1, wherein the single combined bit-shifting operation for scaling the result of the tensor product to a scale of the bias tensor is performed before the addition of the bias tensor.

20. The method of claim 7, wherein the single combined bit-shifting operation for scaling the result of the tensor product to a scale of the bias tensor is performed before the addition of the bias tensor.

21. The apparatus of claim 13, wherein the single combined bit-shifting operation for scaling the result of the tensor product to a scale of the bias tensor is performed before the addition of the bias tensor.

22. The apparatus of claim 16, wherein the single combined bit-shifting operation for scaling the result of the tensor product to a scale of the bias tensor is performed before the addition of the bias tensor.

* * * * *